(12) United States Patent
Moon et al.

(10) Patent No.: US 11,314,109 B1
(45) Date of Patent: Apr. 26, 2022

(54) ELECTRICALLY SWITCHABLE INFRARED MIRRORS USING PHASE-CHANGE CHALCOGENIDES MATERIALS

(71) Applicant: HRL Laboratories, LLC, Malibu, CA (US)

(72) Inventors: Jeong-Sun Moon, Moorpark, CA (US); Adour V. Kabakian, Monterey Park, CA (US); David H. Chow, Newbury Park, CA (US); Richard M. Kremer, Ramona, CA (US)

(73) Assignee: URL Laboratories, LLC, Malibu, CA (US)

( * ) Notice: Subject to any disclaimer, the term of this patent is extended or adjusted under 35 U.S.C. 154(b) by 181 days.

(21) Appl. No.: 16/663,258

(22) Filed: Oct. 24, 2019

Related U.S. Application Data

(62) Division of application No. 15/599,434, filed on May 18, 2017, now abandoned.
(Continued)

(51) Int. Cl.
*G02F 1/01* (2006.01)
*G02F 1/00* (2006.01)

(52) U.S. Cl.
CPC .......... *G02F 1/0147* (2013.01); *G02F 1/0054* (2013.01); *G02F 2201/34* (2013.01); *G02F 2201/38* (2013.01); *G02F 2203/11* (2013.01)

(58) Field of Classification Search
CPC .... H01S 5/021; H01S 5/02326; H01S 5/0234; H01S 5/02375; H01S 5/0687; H01S 5/1032; H01S 5/142; H01S 3/13; H01S 5/0085; H01S 5/02415; H01S 5/4012; H01S 5/02251; H01S 5/026; H01S 5/028; H01S 5/0287; H01S 5/0612; H01S 5/1007; H01S 5/34306; H01S 5/40; H01S 5/4006; H01S 5/5018; H01S 5/02325; H01S 5/02438; H01S 5/06804; H01S 5/141; G02B 2006/12061; G02B 2006/12097; G02B 2006/12121; G02B 2006/12123; G02B 2006/12142; G02B 2006/12147; G02B 2006/1215; G02B 6/12004; G02B 6/1228; G02B 6/126; G02B 6/4246; G02B 6/428;
(Continued)

(56) References Cited

U.S. PATENT DOCUMENTS 4,394,060 A   7/1983   Verber
5,835,199 A   11/1998  Phillips
(Continued)

OTHER PUBLICATIONS

U.S. Appl. No. 15/599,434, Moon, filed May 18, 2017.
(Continued)

*Primary Examiner* — Brandi N Thomas
(74) *Attorney, Agent, or Firm* — Ladas & Parry (57) ABSTRACT

A spatial light modulator cell and arrays of spatial light modulator cells are disclosed. The spatial light modulator cells can comprise a phase change material (PCM) having a first side and a second side; an optical reflector configured to reflect an optical beam passing from the first side to the second side; and a PCM heater thermal conductively coupled to the PCM, wherein thermal modulation of the PCM modulates a phase of the PCM which varies light transmission through the PCM. Methods of making spatial light modulator cells and arrays are also disclosed.

19 Claims, 5 Drawing Sheets

Related U.S. Application Data (60) Provisional application No. 62/339,786, filed on May 20, 2016.

(58) Field of Classification Search
CPC .. G02F 1/0147; G02F 1/0121; G02F 2203/02; G02F 2203/055; G02F 2203/34; G02F 1/0054; G02F 1/19; G02F 2201/343; G02F 2202/30; G02F 2203/12; G02F 2203/50; G02F 1/009; G02F 1/0102; G02F 1/0105; G02F 1/0126; G02F 1/0311; G02F 1/0316; G02F 1/09; G02F 1/13; G02F 1/132; G02F 1/13306; G02F 1/133365; G02F 1/133382; G02F 1/1335; G02F 1/13363; G02F 1/133638; G02F 1/1337; G02F 1/1347; G02F 1/136; G02F 1/136286; G02F 1/1368; G02F 1/13718; G02F 1/1372; G02F 1/139; G02F 1/172; G02F 1/195; G02F 1/212; G02F 1/2255; G02F 1/2257; G02F 1/31; G02F 2201/17

See application file for complete search history.

(56) References Cited

U.S. PATENT DOCUMENTS

| | | | |
|---|---|---|---|
| 5,852,492 A | 12/1998 | Nimblett | |
| 6,819,469 B1 * | 11/2004 | Koba | G03H 1/2294 359/290 |
| 7,817,464 B2 * | 10/2010 | Kuh | H01L 45/144 365/163 |
| 8,908,251 B2 | 12/2014 | Sayyah | |
| 9,733,544 B2 | 8/2017 | Sayyah | |
| 9,735,885 B1 | 8/2017 | Sayyah | |
| 2005/0030881 A1 * | 2/2005 | Endoh | G11B 7/263 369/275.4 |
| 2006/0088239 A1 * | 4/2006 | Aalto | G02F 1/3133 385/1 |
| 2009/0096545 A1 | 4/2009 | O'Hara | |
| 2009/0262766 A1 | 10/2009 | Chen | |
| 2010/0118243 A1 | 5/2010 | Majumdar | |
| 2010/0301971 A1 | 12/2010 | Yonak | |
| 2014/0080729 A1 | 3/2014 | Grego | |
| 2014/0211298 A1 | 7/2014 | Sayyah | |
| 2015/0062691 A1 | 3/2015 | Sayyah | |

OTHER PUBLICATIONS

From U.S. Appl. No. 15/599,434 (unpublished, non-publication request filed), Advisory Action dated Oct. 1, 2019.
From U.S. Appl. No. 15/599,434 (unpublished, non-publication request filed), Advisory Action dated Sep. 25, 2019.
From U.S. Appl. No. 15/599,434 (unpublished, non-publication request filed), Advisory Action dated Jul. 31, 2019.
From U.S. Appl. No. 15/599,434 (unpublished, non-publication request filed), Office Action dated Apr. 25, 2019.
From U.S. Appl. No. 15/599,434 (unpublished, non-publication request filed), Office Action dated Oct. 15, 2018.
From U.S. Appl. No. 15/599,434 (unpublished, non-publication request filed), Office Action dated Apr. 18, 2018.
Adany et al., "Chirped Lidar Using Simplified Homodyne Detection," Journal of Lightwave Technology, vol. 27, No. 16, Aug. 15, 2009, pp. 3351-3357.
Hand, Thomas Henry, "Design and Applications of Frequency Tunable and Reconfigurable Metamaterials", PhD Dissertation, Department of Electrical and Computer Engineering Duke University, 2009 (208 pages).
McManamon, P.F. et al., "Optical Phased Array Technology", Proceedings of IEEE, vol. 84, No. 2, 1996, p. 268-298.
McKeag et al., "New Developments in HgCdTe APDs and LADAR Receivers," Proc. SPIE 8012, Infrared Technology Applications XXXVII, 801230, Jun. 20, 2011, pp. 801230-1-801230-14.
Vasey, F. et al., "Spatial optical beam steering with an AlGaAs integrated phased array", Applied Optics, vol. 32 (1993) p. 3220-3232.
Yu, Jirong, et al., "High Energy Double-pulsed Ho:Tm:YLF Laser Amplifier", NASA Langley Research Center, Laser System Branch, MS 474, Hampton, VA 23681, NTRS Doc ID: 20030015400, 2002 (4 pages).
From U.S. Appl. No. 13/754,140 (now U.S. Pat. No. 8,908,251), Notice of Allowance dated Aug. 4, 2014.
From U.S. Appl. No. 14/795,860 (now U.S. Pat. No. 9,735,885), Office Action dated Dec. 13, 2016.
From U.S. Appl. No. 14/795,860 (now U.S. Pat. No. 9,735,885), Notice of Allowance dated Sep. 6, 2016.
From U.S. Appl. No. 14/795,860 (now U.S. Pat. No. 9,735,885), Notice of Allowance dated Apr. 20, 2017.
From U.S. Appl. No. 14/532,774 (now U.S. Pat. No. 9,733,554), Restriction Requirement dated Nov. 10, 2015.
From U.S. Appl. No. 14/532,774 (now U.S. Pat. No. 9,733,554), Office Action dated Feb. 18, 2016.
From U.S. Appl. No. 14/532,774 (now U.S. Pat. No. 9,733,554), Final Office Action dated Aug. 8, 2016.
From U.S. Appl. No. 14/532,774 (now U.S. Pat. No. 9,733,554), Notice of Allowance dated Jan. 5, 2017.
From U.S. Appl. No. 14/532,774 (now U.S. Pat. No. 9,733,554), Notice of Allowance dated Apr. 11, 2017.

* cited by examiner

ELECTRICALLY SWITCHABLE INFRARED MIRRORS USING PHASE-CHANGE CHALCOGENIDES MATERIALS

CROSS REFERENCE TO RELATED APPLICATIONS

The present application claims the benefit of and is a divisional of U.S. patent application Ser. No. 15/599,434 filed on May 18, 2017, which claims priority to U.S. provisional application No. 62/339,786 filed on May 20, 2016, the disclosures of which are incorporated herein by reference in their entireties.

NOTICE OF GOVERNMENT FUNDING

This invention was made with government support under contract W911NF-16-C-0007 awarded by Defense Advanced Research Projects Agency (DARPA). The government has certain rights in this invention.

TECHNICAL FIELD

The present writing is directed in general to the field of spatial light modulators (SLMs) and in particular, to the area of electrically switchable infrared mirrors. The technology presented herein and obvious from that which is presented, is applicable to programs and systems that utilize phase-change chalcogenides as switchable infrared mirrors or SLMs.

BACKGROUND

Light modulators are known to those skilled in the art. Some such modulators suffer from low switching speeds and others operate only in certain frequency ranges. The present technology attempts to resolve a number of limitations of the prior art.

A SLM is a device that can modulate the amplitude, phase, and/or polarization of light waves such as to steer the light waves or otherwise affect them. SLMs can be used for various applications including imaging, projection display, laser beam shaping, and optical tweezers. Some of these applications extend into the IR spectrum, and can be used to support IR imaging, IR beam modulation in amplitude and phase as well as IR beam clipping. SLMs can be made of microelectromechanical systems (MEMS), micro-mirror arrays, or liquid crystal on silicon (LCoS) devices. Generally, LCoS-based SLMs are limited to applications with a wavelength below 1.6 μm. MEMS-based SLMs can in some cases be suitable for a broader range of wavelengths but, due to their limitations, their angle of deflection is typically limited to ±12 degrees and have a limited switching speed of below around 100 kHz.

There is a need in the field of SLMs for a device with greater flexibility that has improved characteristics regarding one or more of operation in the infrared spectrum with impressive switching speeds, a field of view, such as a wide field of view and angle of deflection such as an angle of deflection that is better than the plus minus 12-degrees.

SUMMARY

The technology presented here is comprised of SLMs using phase-change materials (PCM).

To address one or more of the above-noted deficiencies of the prior art, an embodiment according to the principles of the technology and methodology presented in this writing provides a spatial light modulator cell comprising a PCM having a top side and a bottom side, an optical reflector at the bottom side, and a heating and/or cooling or temperature affecting device to affect the temperature of the PCM, wherein an optical beam incident on the top side of the PCM is modulated to change its intensity by adjusting the phase of the PCM.

Another embodiment, according to the principles of the technology and methodology presented in this writing, provides a programmable, infrared mirror comprising an array of light modulator cells mounted on a substrate, wherein each of the light modulator cells comprises a layer of PCM having a top side and a bottom side, a layer of optical reflector material on the bottom side of the PCM, a layer of metal heating material between the optical reflector layer and the substrate, and a means of heating the metal heating material, wherein an optical beam incident on the top side of the PCM is modulated by adjusting the temperature of the PCM.

A method of making a programmable infrared mirror is also disclosed, the method comprising fabricating an array of unit cells on a substrate, wherein fabricating a unit cell comprises fabricating a layer of metal heating material on top of a substrate, providing a means of heating the metal heating material, fabricating a layer of optical reflecting material on top of the layer of metal heating material and fabricating a layer of phase change material on top of the optical reflecting material, wherein an optical beam incident on the layer of the PCM is modulated by controlling the heating of the PCM by the metal heating material.

In a first aspect, a spatial light modulator cell is provided, the spatial light modulator cell comprising a phase change material (PCM) having a first side and a second side, an optical reflector configured to reflect an optical beam passing from the first side to the second side, and a PCM heater thermal conductively coupled to the PCM, wherein thermal modulation of the PCM modulates a phase of the PCM which varies light transmission through the PCM.

In a second aspect, a programmable infrared mirror is provided, the programmable infrared mirror comprising an array of light modulator cells mounted on a substrate, wherein each of the light modulator cells comprises a layer of PCM having a first side and a second side, a layer of optical reflector material configured to receive an optical beam from the second side of the PCM, and a PCM heater thermally coupled conductively to the PCM, wherein the optical beam incident on the first side of the PCM is optically modulated to change its intensity by varying the temperature of the PCM by the PCM heater.

In a third aspect, a method of making a programmable infrared mirror is provided, the method of making a programmable infrared mirror comprising fabricating an array of separate unit cells on a substrate, wherein fabricating a unit cell comprises adding a layer of optical reflecting material on top of the substrate, and including a layer of phase change material (PCM) on top of the optical reflecting material, thermally coupling a PCM heater with the PCM, wherein an optical beam incident on the PCM is modulated to change its intensity by controlling the heating of the PCM by the PCM heater.

In a fourth aspect, a method of making unit cells for holding switchable infrared mirrors is provided, the method of making unit cells for holding switchable infrared mirrors using phase-change materials comprising the steps of: providing a substrate, such as a silicon wafer having a top side and opposing bottom side; oxidizing the top side of the substrate to form a suitable thermal barrier; applying a mask layer on the top side of the substrate creating etching areas for unit cell; placing a micro heater material in each unit cell; adding a reflector material on the micro heater material in each unit cell; depositing a phase changing material over the reflector material in each unit cell; creating vias through the bottom side of the substrate to a base of the micro heater material; depositing electrical conductor material in the vias; presenting Silicon dioxide to fill spaces and voids between the unit cells; and grinding and polishing the top surface before finishing it with a suitable anti-reflection coating.

In a fifth aspect, a method of making phase-change wafer is provided, the method of making phase-change wafer comprising the steps of: mounting a silicon wafer as a substrate on a carrier plate; treating the top of the substrate to form an insulating layer; applying a mask layer on the insulating layer to create etch areas; etching the etch areas; depositing an absorber material on the etched areas; covering the top side of the absorber material with a thermal barrier material to create a thermal barrier layer; masking the thermal barrier layer and the insulating layer to create etch areas for a unit cell cavity; etching a unit cell cavity; creating vias from the bottom of the substrate through to the unit cell cavity and the thermal barrier material; depositing an electrical conductor material in the vias; depositing in the unit cell cavity and on top of the vias micro heater material, thereby connecting the vias to the micro heater; depositing a metal reflector material on top of the micro heater material; depositing a phase change material on the metal reflector material; filling the area around the unit cell with a thermal barrier; grinding and polishing the top surface of the wafer; and placing an anti-reflection coating on top of the ground and polished area of the wafer.

In a sixth aspect, a spatial light modulator cell is provided, the spatial light modulator comprising a phase change material (PCM) having a first side and a second side; an optical reflector configured to reflect an optical beam passing from the first side to the second side; and a PCM heater disposed on the second side of the PCM, wherein thermal modulation of the PCM modulates a phase of the PCM.

In a seventh aspect, a programmable infrared mirror is provided, the programmable infrared mirror comprising a layer of PCM responsive to infrared light having a first side and a second side; a layer of optical reflector material configured to reflect an optical beam from the first side of the PCM; and a PCM heater thermally coupled to the second side of the layer of the PCM, wherein the optical beam incident on the first side of the PCM is modulated in intensity by varying the phase of the PCM by the PCM heater.

In an eighth aspect, an array of spatial light modulators is provided, the array of spatial light modulators comprising a first and a second spatial light modulator, each of the first and the second spatial light modulator independently comprising a phase change material (PCM) having a first side and a second side; an optical reflector configured to reflect an optical beam passing from the first side to the second side; and a PCM heater disposed on the second side of the PCM, wherein thermal modulation of the PCM modulates a phase of the PCM, wherein the first spatial light modulator is located adjacent to the second spatial light modulator.

In an embodiment of the eighth aspect, the PCM of the first spatial light modulator has a first composition and the PCM of the second spatial light modulator has a second composition, the first composition not the same as the second composition.

In an embodiment of the eighth aspect, the PCM of the first spatial light modulator has a first composition and the PCM of the second spatial light modulator has a second composition, the first composition being the same as the second composition.

The technology and methodology presented in this writing set forth an electrically switchable mirror comprising an array of unit cells comprising phase-change chalcogenide materials such as Germanium Tellurium (GeTe) or Bismuth doped GeTe (GeTe:Bi) alloy. In this embodiment, the electrically switchable mirror can include GeTe or GeTe:Bi alloy on top of an optical reflector and a metal heater plate. Depending on the material phase (amorphous or crystalline), infrared light can be reflected or not. The material phase is controlled electrically by a voltage pulse applied to an individual heater plate. In some embodiments, a cooler can be effectively used. In some embodiments, a heater and a cooler can be combined in a single device such as a thermoelectric device such as a Peltier device. The disclosed PCM-based electrically switchable mirrors can also form a SLM.

Certain embodiments may provide various technical advantages depending on their implementation. For example, a technical advantage of some embodiments may include the capability to provide a large array of light modulating cells in the IR spectrum. In other embodiments, the capability to provide a high switching speed of spatially modulating light may be the focus of the implementation.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the technology and methodology herein presented and its potential advantages, reference is now made to the following description taken in conjunction with the accompanying drawings in which like reference numerals represent like parts.

DETAILED DESCRIPTION

Although example embodiments are here illustrated, the proposed technology may be implemented using any number of techniques, whether currently known or not. The proposed technology should in no way be limited to the example implementations, drawings, and techniques illustrated below. Additionally, the drawings are not necessarily drawn to scale.

Light modulators that can modulate the amplitude, phase and polarization of light waves have been around for some time. However, the requirements of programmable light modulators have been changing rapidly to meet the needs of the ever-growing demands of high-resolution, high-speed optical devices needed to accomplish growing consumer demands for sophisticated gadgets as well as advanced military missions. Along with the recent advances in laser technology, the performance requirements of SLMs have exceeded the capabilities of the two basic technology areas that are in use today.

Figure 1:
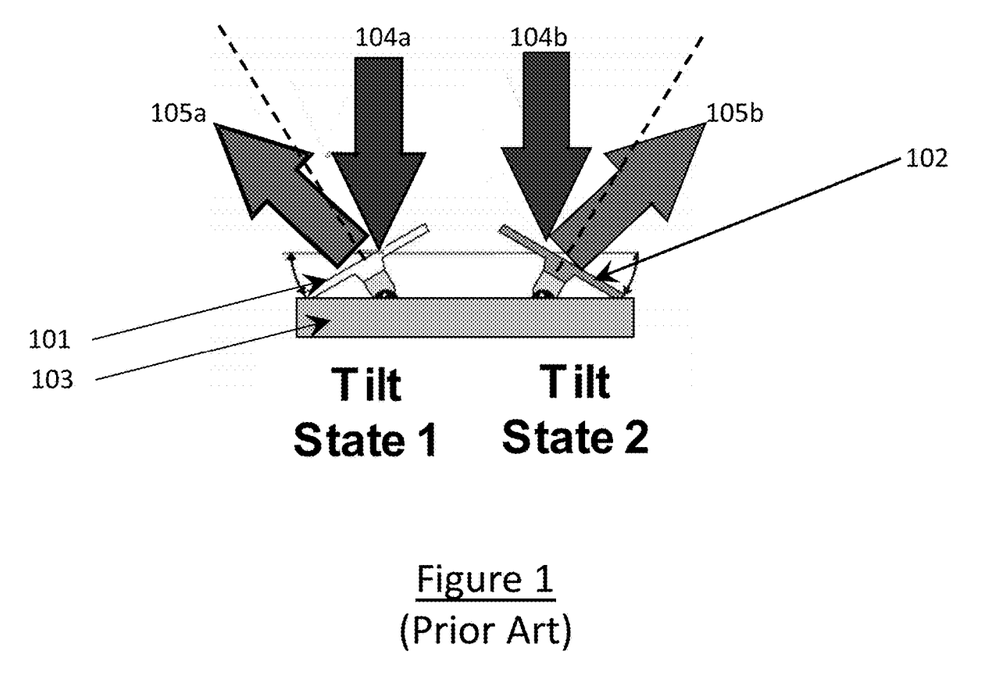
FIG. 1 illustrates a prior art device of a spatial light modulator using a MEMS micro-mirror array.

To understand the concepts of the present technology, it is helpful to review briefly the two leading technology areas in the field of light modulators. FIG. 1 illustrates the basics of an light modulator using the principles of MEMS. The MEMS modulator uses many tiny micro mirrors that are electrically stimulated to rotate or move in different dimensions. For example, a micro-mirror (101) mounted on a platform (103), in a first state can deflect an incident light wave (104a) to the direction of (105a), while the micro-mirror when electrically stimulated moves to another position as represented by micro-mirror (102) and deflects the incident light wave (104b) in a different direction (105b). Thus, the speed of modulation as well as the frequency band in which the present art devices operate are limited by the manner in which electrical stimulus can move mirrors mechanically as well as the time required for the physical movement of the micro-mirrors. Typically, and as previously noted, these MEMS-based light modulators are limited to a small angle of deflection (±12 degrees) and the switching speed is typically limited to the kilohertz range.

Figure 2:
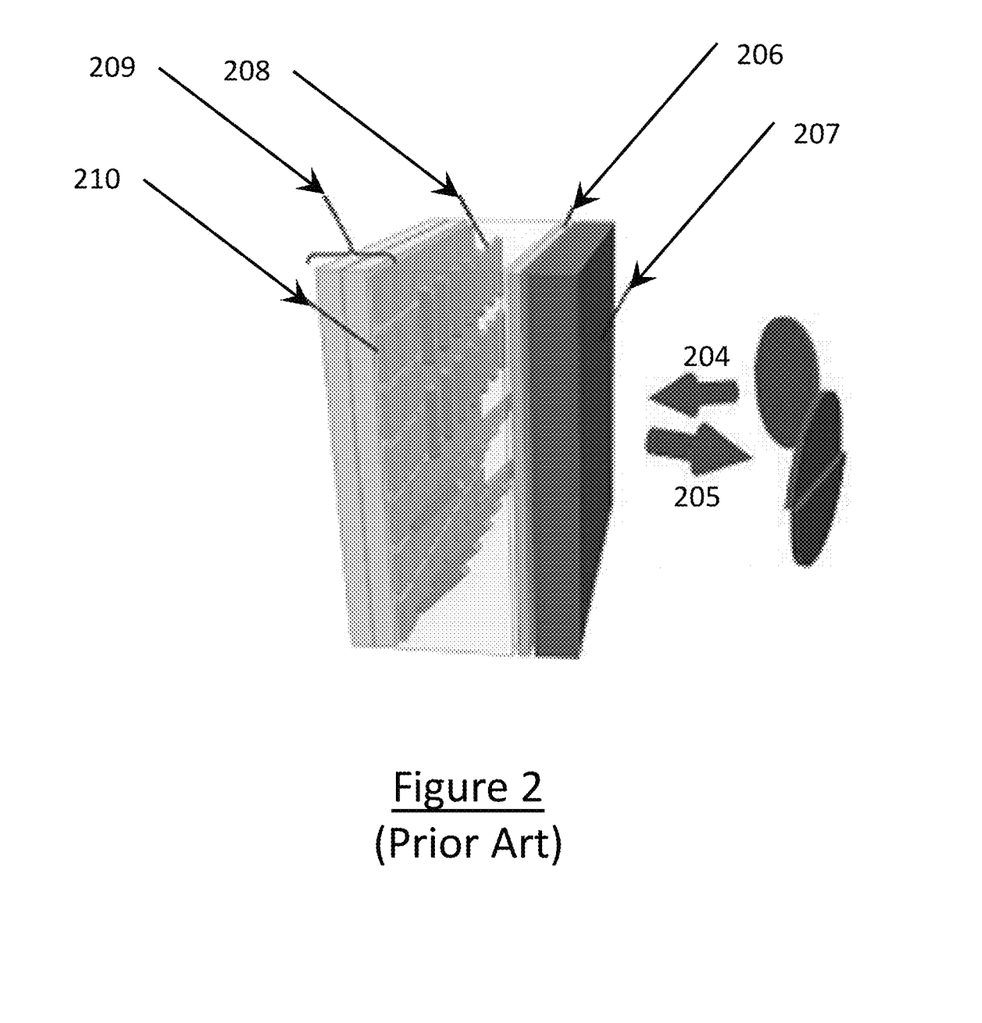
FIG. 2 illustrates a prior art device of a spatial light modulator using LCoS technology as seen on the website of Hamamatsu www.hamamatsu.com/us/en/4015.html.

FIG. 2 illustrates another leading technology area of LCoS. This technology is used in modulating light spatially. Here, the section of light modulation typically consists of a liquid crystal layer 208 mounted on top of an array of pixel electrodes 210. The pixel electrodes 210 are stimulated by CMOS circuits 209 on which they are mounted. A transparent electrode layer 206 and a glass substrate layer 207 cover the liquid crystal layer 208 to provide for a smooth optical interface. An incident light 204 is modulated by the LCoS by electrically controlling the CMOS circuits 209. The resulting modulated light 205 emerges as output. Light modulators based on LCoS technology can modulate phase or amplitude of optical beams. Due to the limitations of the LCoS technology, the light space modulators using this technology function only below 1.6 µm in wavelength.

To overcome the limitations of the prior art, the concepts presented in this writing use a different technology than the traditional ones described earlier, to create spatial light modulators.

A chalcogenide is a member of a class of materials containing selenium (Se), Tellurium (Te), or Sulfur (S). Chalcogenide-based, PCMs have been used in rewritable optical DVDs, which use a laser light to write or erase information. A unique feature of PCMs is a large change in the refractive index between a crystalline state and an amorphous state in the IR wavelength range. In addition, the optical absorption characteristics change between the crystalline state and the amorphous state in the IR wavelength range. Various embodiments of the now presented technology and methodology utilize the foregoing characteristics.

The applications of PCM in rewritable optical DVDs have been developed using chemical alloys such as $Ge_2Sb_2Te_5$ (Germanium-Antimony-Tellurium) or silver and Indium replacing the Germanium (such as $AgSb_2Te_5$ and $InSb_2Te_5$). Lately, PCMs have been developed for non-volatile memory as a future replacement for flash memory in the integrated circuit (IC) industry by companies such as Micron, Samsung, IBM, STMicroelectronics, and Intel. Also, PCMs are being developed for RF switch applications. Some applications use the GeSbTe memory alloy for visible display. These PCM alloys are believed to have not been used in the ways presented in this writing.

Figure 3:
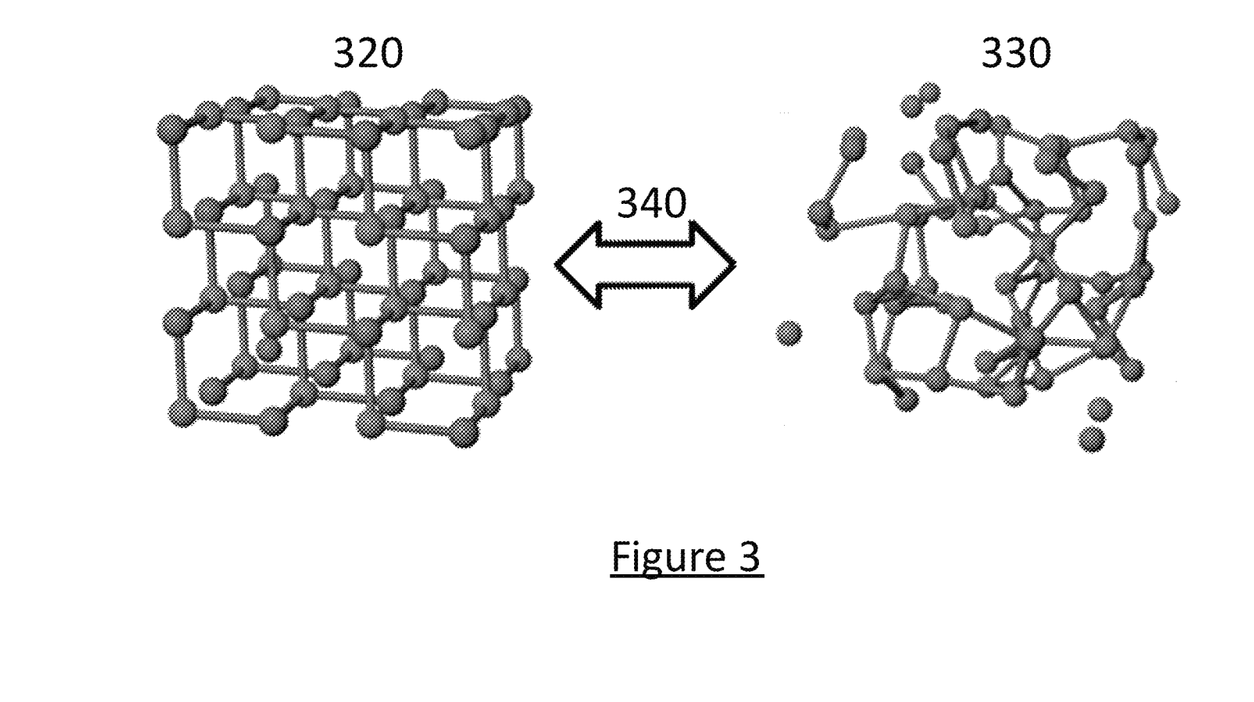
FIG. 3 illustrates a critical physical property of chalcogenide PCMs, according to an embodiment of the technology herein presented.

FIG. 3 illustrates important phase change characteristics of embodiments of certain PCM alloys that can be used in the technological device and methodology presented here. FIG. 3 illustrates the spatial structure of a crystalline (320) Germanium-Tellurium (GeTe) alloy and the spatial structure of an amorphous state (330) of the Germanium-Tellurium (GeTe) alloy. It can be noted that the alloy is non-volatile in both the amorphous state and in the crystalline state. Though in the amorphous state (330), the alloy does not have a regular shape and lacks a regular lattice structure, it remains non-volatile. It has been discovered that the process can be reversed easily and that the alloy state can be switched back and forth between crystalline and amorphous states with local application of heating or heating and cooling cycles. Preferably, suitable alloys for use in the electrically switchable mirrors described herein will have the characteristics of repeatability and reversibility of such a phase change while staying non-volatile. In addition, the technological devices and methodology presented can take advantage of the optical behavior of certain nonvolatile PCM alloys and create a stable switching mechanism (340) illustrated as an arrow in FIG. 3 to switch materials at high speeds between the crystalline (320) and amorphous (330) states. The performance of the proposed light modulation can directly depend on the stability of the amorphous and crystalline states as well as the ease of switching the material in use from state to state and how fast the material can be switched between the crystalline and amorphous states. FIG. 3 illustrates the GeTe material fabricated at HRL laboratories on silicon substrates with around a 200° C. crystallization temperature with greater than $10^5$ resistance ratios, and direct current (DC) conductivity of approximately 3000 S/cm and with very high p-type carrier mobility. The GeTe material was prepared by sputtering material directly on $TiW/SiO_2/Si$ (Titanium Tungsten/Silicon dioxide/Silicon substrate) and the material exhibited a stable phase transition at around 200° C. The GeTe material has a large band gap of approximately 0.8 eV (amorphous) and approximately 0.7 eV (crystalline) at room temperature. However, other chalcogenide materials including other chalcogenic GeTe materials can also be successfully employed as taught herein.

Figure 4:
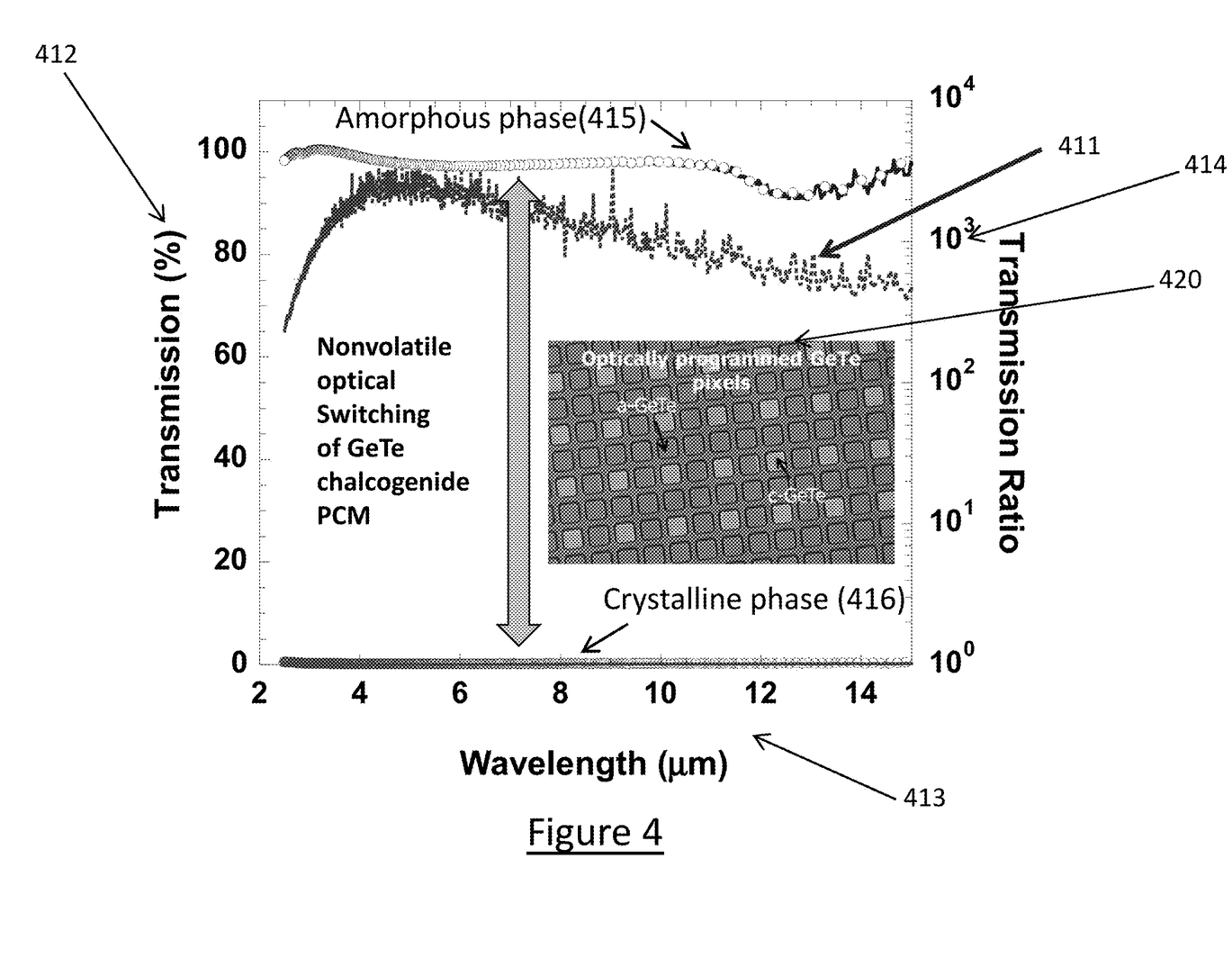
FIG. 4 illustrates measured optical properties associated with certain chalcogenide PCMs, according to an embodiment of the technology herein presented.

Some of the underlying optical characteristics of the PCM alloys that can be exploited with the technology described here are presented in the graph of FIG. 4 which shows the light transmission characteristics of an exemplary chalcogenide material of GeTe that is about 200-400 nm thick. As discussed below, this chalcogenide material was made by depositing GeTe alloy directly onto $SiO_2/Si$ wafer at room temperature by sputtering. In FIG. 4, (1) The horizontal axis (413) is wavelength in micro meters.
(2) There are two vertical axes (412 and 414).
  (a) On the left vertical axis (412) is % of transmitted light amplitude over the incident light amplitude.
  (b) On the right vertical axis (414) is the transmission contrast ratio.

The two vertical axes (412 and 414) illustrate two features of the PCM. The crystalline phase (416) and amorphous phase (415) are for the left vertical axis (412) and the curve (411) is for the right vertical axis (414). The curve (411) is a contrast or transmission ratio between the amorphous phase (415) and crystalline phase (416). FIG. 4 shows how the PCM is responsive to the incident light meaning that the PCM affects the incident light, such as by reducing light transmission, when in the one form as compared to another crystal form. In some embodiments, a very high contrast ratio between incident and transmitted light can be achieved by the PCM being responsive to the incident light.

For some materials and some wavelengths of light, the contrast ratio can be described by the equation:

$$10 \log_{10}(\text{Contrast Ratio}) = 67x$$

where:
Contrast Ratio is the ratio of the transmitted light amplitude to the incident light amplitude, and
x is the length of the light path in micrometers.

However, different materials and materials with different degrees of shift between amorphous and crystal phase, a modified form of the equation can be used. Also, with different wavelengths of light, the light can be absorbed to a greater or lesser extent and a different version of the equation would be used.

FIG. 4 is a graph which shows measured optical transmission characteristics as a percentage ratio of transmitted amplitude of light over incident amplitude of light (looking to the vertical axis on the left (412)) of a GeTe alloy during a switch between the crystalline state (c-GeTe) to the amorphous state (a-GeTe) as a function of wavelength (horizontal axis (413)). The curve (411) illustrates the transmission contrast ratio using the vertical axis on the right (414). The transmission contrast ratio is defined as the ratio of the transmission of the bright state (high transmission) to the transmission of the dark state (low or zero transmission). Stated otherwise, the curve (411) is a contrast ratio of a high transmission state (a-GeTe) to a low transmission state (c-GeTe) of a transmitted optical beam measured for a wavelength from 2 to 15 micrometers. However, in various embodiments, an optical beam can be any appropriate light illumination or light beam or irradiation with electromagnetic radiation, either coherent or not, of a desired wavelength. In certain preferred embodiments, the optical beam can be or include visible light or infrared light or a combination thereof. In some preferred embodiments, the optical beam can be a coherent infrared light beam, such as a laser beam. The percentage of the incident optical beam that is transmitted is plotted using the vertical axis on the left (412). As seen in FIG. 4, the a-GeTe phase labeled as the amorphous phase (415) is close to being a perfect transmitter with a >95% transmission rate and the c-GeTe phase labeled as the crystalline phase (416) acts as a very strong absorber, yielding a good transmission contrast ratio in the M/LWIR (medium to long wavelength bands of the IR spectrum). The extremely high absorption of the c-GeTe (416) enables ultrathin GeTe or GeTe:Bi (Germanium Tellurium-Bismuth) pixels to be fabricated to serve as spatial light modulators. This virtually eliminates the sidewall scattering loss typically experienced in the liquid crystal and MEMS SLMs. The inset image (420) in FIG. 4 shows an embodiment of this technology with the measured optical property change associated with a-GeTe and c-GeTe in an image of a 2×2 µm² pixels programmed optically with side-by-side stable states.

FIGS. 3 and 4 show the dramatic change in the optical properties in this M/LWIR which forms a basis of the technology and methodology disclosed wherein the devices shown switch between an efficient reflector state and a very strong absorber state with notable great contrast.

Figure 5:
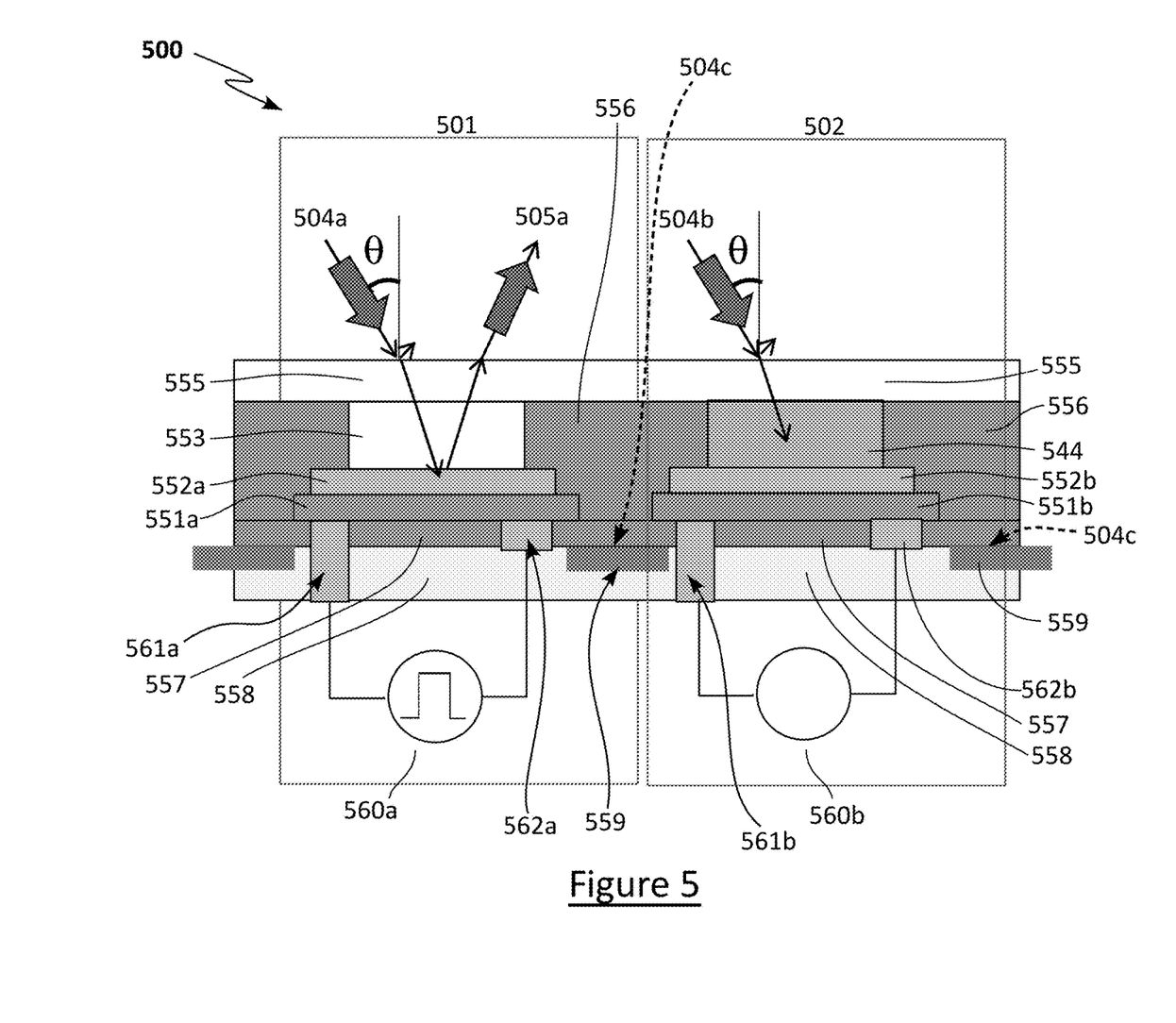
FIG. 5 illustrates a programmable PCM infrared mirror/reflector, according to an embodiment of the technology herein presented.

FIG. 5 illustrates a schematic drawing of programmable infrared mirror 500, as an embodiment of the technology disclosed herein. FIG. 5 depicts electrically switchable IR mirror (500) operating in the MWIR and LWIR ranges. The device in FIG. 5 is comprises an array of light modulating unit cells (501 and 502) located adjacent to one another. In some embodiments, unit cells of an array can be disposed on a common substrate or can be disposed on separate substrates. Shown in FIG. 5 is a unit cell in the amorphous state and a unit cell in the crystalline state (501 and 502 respectively). Here, two unit cells (501 and 502) are shown on the same substrate (558). FIG. 5 shows a mirror (500) as a 1×2 array of unit cells, however, mirror (500) can be a different size array including a 1×1 array, linear arrays, two dimensional arrays and larger arrays. The state of each unit cell of a mirror can be controlled together, separately, or in blocks.

The concepts presented herein can be utilized in arrays of unit cells, including one-dimensional arrays and two-dimensional arrays, and these arrays can be arranged in the same way, for example, as illustrated in FIG. 5 which shows two units or unit cells (501 and 502) which in one embodiment are shown as one amorphous and one crystalline. However any particular array can have any combination of unit cells having crystalline and amorphous phases as desired. Programmable mirrors (500) or device (500) can comprise unit cells (501 and 502), unit cell (501) having an amorphous PCM (a-PCM) material (553) and unit cell (502) having a crystalline PCM (c-PCM) material (554). Each PCM can be mounted on metal reflectors (552a and 552b respectively) or other types of reflectors. The metal reflectors (552a and 552b) can be each on a micro heater or PCM heater (551a and 551b respectively) although any type of temperature affecting device can be used which provides sufficient changes in temperature in a suitable space of time to achieve the desired phase transition and the desired switching time, which can be mounted ultimately on substrate (558). A suitable thermal barrier (557) can be used underside of the metal reflectors (552a and 552b) and micro heaters or PCM heaters (551a, 551b) to avoid heating the substrate (558) as the PCMs (553, 554) are cycled through different phases. One preferred thermal barrier is $SiO_2$, although other materials having suitably low thermal conductivity can also be successfully employed.

In various embodiments, PCM heaters can be any suitable device which provides a temperature change to the PCM, including but not limited to resistive heaters, and resistive heaters comprising titanium tungsten. In preferred embodiments, the PCM heater can be thermally coupled to the PCM, wherein heat can travel in whole or in part between the PCM heater and the PCM via thermal conduction. In some embodiments, a PCM heater can also provide cooling, such as by use of a thermoelectric device. In some embodiments, a PCM heater can be driven by a voltage, in some embodiments, a PCM heater can be driven by a current. It must be noted that the underside micro heaters or PCM heaters (551a and 551b) can be replaced with other means of heating or affecting the temperature of the PCMs (553, 554). Examples include Peltier heaters/coolers. The PCMs could instead be heated through their sides, by laser or other means as will be known to those skilled in the art. The thermal barrier material (556 and 557) also can surround and/or fill the space around reflectors (552a and 552b), heaters (551a and 551b) and the PCMs (553 and 554). An anti-reflection coating (555) can be present and is generally preferred to be present and can serve as the top layer of device/programmable infrared mirrors (500). The device/programmable infrared mirrors (500) can be connected to external pulse generators (560a and 560b) to provide pulsed currents of appropriate durations to control the PCM by way of micro heaters (551a and 551b) through metal vias (561a, 562a, and 561b and 562b respectively) as shown. The pulse generators (560a and 560b) can also be integrated into the device (500) on the same substrate (558). Absorbers (559) between units (501 and 502) are used to isolate devices.

Reflectors (552a, 552b) on top of the PCM heater or micro heaters (551a, 551b) can be optical reflectors, such as metal mirrors or reflective devices capable of sufficiently reflecting light of the appropriate wavelength. In some embodiments, the reflectors (552a, 552b) can operate by a property of reflectance and in some embodiments the reflective property can be based upon refraction, such as with a refractive mirror. The PCM heater and the micro-heater (551a, 551b) can be the same or they can be different. Both (556 and 557) are thermal barriers. The same material or different materials can be used. In one embodiment, $SiO_2$ can be used as a thermal barrier 557. In some embodiments, other materials or combinations of material can be used which provide resistance to thermal conductance, as will be known to those skilled in the art.

In operation, the pulse generators (560a and 560b) (or voltage, current or power sources) can provide DC current/voltage pulses (or other flow of energy) of appropriate magnitude and duration to the PCM heaters or micro heaters (551a and 551b) that can heat the PCMs (553, 554). PCM in the crystalline state can be changed to an amorphous state, with a change in the optical characteristics of the PCM, by heating the PCM to melt the PCM and then rapidly cooling the PCM to an appropriate temperature to solidify the PCM without allowing PCM to crystalize or substantially crystalize. In some embodiments, the melted PCM can be cooled rapidly to below the glass transition point for the PCM. In some embodiments, the entire PCM or substantially all of the PCM can be in an amorphous form. In some embodiments, only a portion of the PCM can be in an amorphous form.

PCM while in the amorphous state can be changed to the crystalline state, with a change in the optical characteristics of the PCM, by heating the PCM and then allowing the PCM to cool at a rate such that a crystalline form of PCM is achieved. In some embodiments, the PCM can be heated to above the glass transition temperature and held for a period of time above the glass transition temperature and/or cooled at a rate such that a crystalline form is achieved. In some embodiments, all or substantially all of the PCM can be in a crystalline form. In some embodiments, only a portion of the PCM can be in a crystalline form.

Different unit cells (501 502) of the PCMs can be kept at different phase states as shown in FIG. 5 wherein there is one a-PCM (553) that is amorphous and one c-PCM (554) that is crystalline. As illustrated in FIG. 5 by lighter shading, the unit cell (501) with the a-PCM (553) is at an amorphous phase and an incident optical beam 504a directed to it can be reflected at (505a). In FIG. 5, the unit cell (502) with the c-PCM (554) is in the crystalline phase, wherein the incident optical beam (504b) directed to it is fully, substantially or significantly absorbed with nothing or substantially nothing or significantly less reflected back. Optical beams incident in open areas of the device, such as at (504c), can be absorbed by absorbers (559) placed underneath the open areas of the device. In addition, by regulating the current pulses to the PCM or micro heaters (551a, 551b), one can achieve intermediate levels of partially amorphous and partially crystalline PCM having an intermediate level of absorption and reflection, and in some embodiments it is possible to control the percentage of absorption and/or the percentage of reflection at each unit cell. One material of absorbers (559) may be crystalline GeTe, however other materials can be usefully employed which can absorb light of a suitable wavelength, such as infrared light.

In some embodiments, the heat directed to one unit cell (501) for phase can be sufficiently isolated from a neighboring unit cell (502) such that the neighboring unit cell (502) is not affected or transitioned between states. In some embodiments, isolation of the temperature change of one unit cell from a neighboring unit cell can result in a sharper cut off spatially, of the phase transitions, and result in sharper optical reflectivity changes with the mirror. $SiO_2$ can be used as a thermal insulator for example, to surround unit cells (501, 502) at (556 and 557) to provide the desired amount of thermal isolation between the unit cells from heat pulses, heat flows, temperature flows that are used. Vias (561a, 561b, 562a, 562b), which can be preferably filled with copper, can carry current pulses or voltage pulses from the pulse generators (560a, 560b) or energy sources to the PCM heaters or micro heaters (551a, 551b) and can extend all of the way to the substrate (558) and absorber (559) between the cells (501, 502). Such an arrangement and construction of the vias can serve to dissipate heat/temperature from the PCM heaters or micro heaters and/or to affect the temperature of the substrate. So, the substrate (558) will be affected by temperature changes. Unit cells (501, 502) can in some embodiments be insulated from heat or temperature change in the substrate (558) such as by the use of insulating layer (557) located on top of substrate (558). In some embodiments, insulating layer (557) can comprise or consist of $SiO_2$.

Various embodiments described herein can be used with light presented in the range of 400 nanometers to 15 μm wavelength. However, other wavelengths of light can also be used such when paired with PCM materials such as chalcogenide materials of appropriate light transmission and absorbing properties.

In one embodiment of the present technology, Germanium Tellurium (GeTe) or Bismuth doped GeTe alloys can be used as PCMs (553 and 554). In one embodiment, Germanium Tellurium (GeTe) or Bismuth doped GeTe alloys can be used for absorbers (559. In some embodiments, the same material can be used for the PCMs as for the absorbers. In one embodiment, a different material can be used for the PCMs as compared to the absorbers. In some embodiments, silicon dioxide can used as the thermal barriers (557) and (556). In some embodiments, copper metal can be used for vias (561a, 562a, 561b and 562b). In some embodiments, the unit cells can be mounted on a silicon substrate (558). In some embodiments, current pulse generators (560a and 560b) can supply typically 10 v to 20 v pulses for duration of about 10 microseconds. In some embodiments, unit cells with a mirror can utilize different materials for PCMS from unit cells with the mirror. In some embodiments, optional absorbers (559) can be included for separation and insulation purposes.

One method of making the unit cells comprise following steps:
(a) mount a substrate (558), such as a silicon wafer, on a carrier plate.
(b) oxidize the top layer of the substrate (558) to form a suitable thermal barrier. Silicon dioxide would do this. Alternatively, a layer of thermal barrier could be added.

(c) apply a mask layer on the silicon dioxide layer created in step (b) using known masking materials (The unmasked areas will be subsequently etched to create space for absorbers (559)).

(d) Etch the unmasked layer by known techniques to create space for absorbers (559)

(e) Deposit absorber material on the etched areas. Possible absorber materials are PCM alloys such as GeTe or other materials which can absorb light of a desired wavelength, such as infrared light. The PCM can be deposited by sputtering at room temperature. Then remove the mask.

(f) Cover the top side of the absorbers (559) with a thermal barrier. One method is to cover these with the same substrate material of (557) such as silicon and oxidize this material to form silicon dioxide.

(g) Mask the top layer with a known masking material leaving the unit cell areas unmasked. Etch unit cell core cavities for unit cells (501 and 502) in the unmasked areas of the top silicon dioxide layer (557)(These unit cell cavities will be filled later with micro heater material (551a 551b), then the reflector material (552a 552b) and then PCM (553, 554)). Then remove the mask.

(h) Create vias (561a, 562a, 561b and 562b) of suitable size using known techniques. These are created vertically from the bottom of the etched core unit cell area (501 and 502) through the silicon substrate (558) and the thermal barrier material (557). A good electrical conductor material such as copper, is deposited in the via holes. Other materials may be as well used as will be obvious to those skilled in the art.

(i) Micro heater material (551a and 551b) (materials with high resistivity) such as $T_iW$ (Titanium Tungsten) or W (Tungsten) is next deposited at the bottom of each unit cell (501, 502) cavity and on top of the vias (561a, 561b, 562a, 562b), thereby connecting the vias of each unit cell.

(j) A suitable metal reflector material (552a and 552b) such as silver, gold or other suitable material is then placed on top of the micro heater material (551a, 551b).

(k) PCM material, in particular chalcogenide materials such as GeTe or Bismuth doped GeTe, is then deposited on top of metal reflectors (552a and 552b) for each unit cell (501, 502).

(l) Silicon dioxide is used to fill the spaces and voids between the unit cells by process steps as indicated before to form areas (556).

(m) The top surface of the wafer then goes through grinding and polishing before being finished with a suitable anti-reflection coating such as Zinc Sulfide (ZnS).

(n) Carrier plate is removed and the semiconductor device manufactured by this process is taken to the next level of integration or packaging.

The foregoing is just one suggested way of manufacturing the infrared mirrors here described. One masking step could be used instead of two. Inclusion of the absorbers is optional. While oxidizing the silicon is described as a way of creating a thermal barrier, instead any material that could act as a thermal barrier could be placed thereon. Finally, it is of course understood that a mask is placed initially to allow specific areas around it to be etched. Thereafter, the mask is removed.

Phase change GeTe alloys can be deposited directly onto $SiO_2$/Si (Silicon dioxide or silicon) wafers at room temperature by sputtering on a large wafer scale and can be transformed into a (poly)crystalline state below 200° C. via structural phase-transition.

The embodiment with the GeTe PCM alloy enables PCM mirrors to maintain close to full-on (approximately 91% optical reflection) and full-off optical contrast greater than 100 to 1 and can be integrated with CMOS control electronics on the backside. Due to the double-pass of the light through the inventors' switchable mirror design, reduction in the thickness of the chalcogenide PCM from 400 nm to 200 nm is possible while maintaining the IR contrast ratio of greater than 1000:1. This reduces the switching power needed for the PCM mirrors. The suitable phase-change chalcogenide include GeTe and Bismuth doped GeTe alloys. The disclosed phase-change GeTe-based electrically-switchable mirrors on silicon wafers offer high speed infrared spatial light modulators.

In the foregoing description, some interesting aspects of the present technology are as follows.

A layer of phase-change chalcogenide is provided.

An optical reflector layer is provided.

A heater is used. The heating can be accomplished by a metallic heater comprising copper, aluminum or silver vias (561a, 561b, 562a, 562b)) and an electric pulse generator (560a, 560b) as illustrated in FIG. 5. The heating can also be accomplished by other means, such as by lasers. as embedded laser cells thereby enabling the deletion of pulse heaters 560a, 560b, and the micro heaters 551a and 551b

An absorption layer (559) can be located in the gap defined by the location of the unit cells (501, 502) and/or at an interface between adjacent unit cells and can extend from within a first unit cell to an interior of a second unit cell. In some embodiments, an interface can comprise a gap.

$SiO_2$ as a thermal barrier isolates the silicon substrate (558) from the surrounding heat.

The phase-change material is covered with an anti-reflection coating.

The phase-change material is deposited by sputtering at room temperature.

In particular configurations, it may be desirable to have other PCM alloys providing the needed optical characteristics and using other means to cause the phase change to switch the optical characteristics of the PCM cells. Many different unit cell configurations can be envisioned using the concepts presented here.

Modifications, additions, or omissions may be made to the systems, apparatuses, and methods described herein without departing from the scope of the proposed technology. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

CONCEPTS

Concept 1. A spatial light modulator cell comprising:
a phase change material (PCM) having a first side and a second side;
an optical reflector configured to reflect an optical beam passing from the first side to the second side; and
a PCM heater disposed on the second side of the PCM, wherein thermal modulation of the PCM modulates a phase of the PCM.

Concept 2. The light modulator cell of Concept 1, wherein the PCM heater comprises a micro heater operated by a controlled current.

Concept 3. The light modulator cell of Concept 1, further comprising a coating of anti-reflective material on the top side of the PCM.

Concept 4. The light modulator cell of Concept 1, wherein the PCM is a chalcogenide.

Concept 5. The light modulator cell of Concept 4, wherein the chalcogenide is Germanium Tellurium (GeTe) or Bismuth doped GeTe.

Concept 6. The light modulator cell of claim 1, wherein the light modulator cell is fabricated on a silicon substrate.

Concept 7. The light modulator cell of Concept 6, wherein a layer of silicon dioxide is present between the light modulator and the substrate.

Concept 8. The light modulator of Concept 1, wherein the PCM heater is not in direct contact with the PCM.

Concept 9. A programmable infrared mirror comprising:
- a layer of PCM responsive to infrared light having a first side and a second side;
- a layer of optical reflector material configured to reflect an optical beam from the first side of the PCM; and
- a PCM heater thermally coupled to the second side of the layer of the PCM, wherein the optical beam incident on the first side of the PCM is modulated in intensity by varying the phase of the PCM by the PCM heater.

Concept 10. The programmable infrared mirror of Concept 9, wherein the PCM heater comprises a layer of metal heating material situated between the optical reflector layer and the substrate.

Concept 11. The programmable optical mirror of Concept 9, further comprising
- an absorber layer located at an interface between the light modulator cells.

Concept 12. The programmable optical mirror of Concept 9, further comprising a coating of anti-reflective material on the first side of the PCM.

Concept 13. The programmable optical mirror of Concept 9, wherein the PCM is a chalcogenide.

Concept 14. The programmable optical mirror of Concept 13, wherein the chalcogenide is Germanium Tellurium (GeTe) or Bismuth doped GeTe.

Concept 15. The programmable optical mirror of Concept 9, wherein silicon dioxide isolates the light modulator cells from the substrate.

Concept 16. A method of making a programmable infrared mirror comprising:
- fabricating an array of separate unit cells on a substrate, wherein fabricating a unit cell comprises:
- adding a layer of optical reflecting material on top of the substrate; and
- including a layer of phase change material (PCM) on top of the optical reflecting material;
- thermally coupling a PCM heater with the PCM, wherein an optical beam incident on the PCM is modulated to change its intensity by controlling the heating of the PCM by the PCM heater.

Concept 17. The method of making the programmable infrared mirror of Concept 16, wherein
the PCM is deposited by sputtering it on the substrate at room temperature.

Concept 18. The method of making the programmable infrared mirror of Concept 16, further comprising depositing a layer of silicon dioxide on the substrate before the step of including the layer of optical reflecting material.

Concept 19. The method of making the programmable infrared mirror of Concept 16, further comprising locating an absorber material at an interface between the unit cells.

Concept 20. The method of making the programmable infrared mirror of Concept 16, further comprising coating the PCM where the optical beam would be incident on the PCM with a reflective coating.

Concept 21. The method of making the programmable infrared mirror of Concept 16, wherein the PCM is made from a chalcogenide.

Concept 22. The method of making the programmable infrared mirror of Concept 21, wherein the chalcogenide used is Germanium Tellurium (GeTe).

Concept 23. The method of making the programmable infrared mirror of Concept 21, wherein the chalcogenide used is Bismuth doped GeTe.

Concept 24. An array of spatial light modulators comprising:
- a first and a second spatial light modulator of Concept 1, wherein the first spatial light modulator is located adjacent to the second spatial light modulator.

Concept 25. The array of spatial light modulators of Concept 24, wherein the PCM heater of the first spatial light modulator is controlled independently of the PCM heater of the second spatial light modulator.

Concept 26. The array of spatial light modulators of Concept 24, wherein the PCM of the first spatial light modulator has a first composition and the PCM of the second spatial light modulator has a second composition, the first composition not the same as the second composition.

Concept 27. The array of spatial light modulators of Concept 24, wherein the first spatial light modulator has a different contrast ratio from the second spatial light modulator.

Concept 28. The array of spatial light modulators of Concept 24, wherein the array is a one-dimensional array.

Concept 29. The array of spatial light modulators of Concept 24, wherein the array is a two-dimensional array.

Concept 30. A method of making unit cells for holding switchable infrared mirrors using phase-change materials comprising the steps of:
- providing a substrate, such as a silicon wafer having a top side and opposing bottom side;
- oxidizing the top side of the substrate to form a suitable thermal barrier;
- applying a mask layer on the top side of the substrate creating etching areas for unit cell;
- placing a micro heater material in each unit cell;
- adding a reflector material on the micro heater material in each unit cell;
- depositing a phase changing material over the reflector material in each unit cell;
- creating vias through the bottom side of the substrate to a base of the micro heater material;
- depositing electrical conductor material in the vias;
- presenting Silicon dioxide to fill spaces and voids between the unit cells; and
- grinding and polishing the top surface before finishing it with a suitable anti-reflection coating.

Concept 31. A method of a making phase-change wafer comprising the steps of:
- mounting a silicon wafer as a substrate on a carrier plate;
- treating the top of the substrate to form an insulating layer;
- applying a mask layer on the insulating layer to create etch areas;
- etching the etch areas;
- depositing an absorber material on the etched areas;

covering the top side of the absorber material with a thermal barrier material to create a thermal barrier layer;

masking the thermal barrier layer and the insulating layer to create etch areas for a unit cell cavity;

etching a unit cell cavity;

creating vias from the bottom of the substrate through to the unit cell cavity and the thermal barrier material;

depositing an electrical conductor material in the vias;

depositing in the unit cell cavity and on top of the vias micro heater material, thereby connecting the vias to the micro heater;

depositing a metal reflector material on top of the micro heater material;

depositing a phase change material on the metal reflector material;

filling the area around the unit cell with a thermal barrier;

grinding and polishing the top surface of the wafer; and placing an anti-reflection coating on top of the ground and polished area of the wafer.

Concept 32. A spatial light modulator cell comprising:
a phase change material (PCM) having a first side and a second side;
an optical reflector configured to reflect an optical beam passing from the first side to the second side; and
a PCM heater thermal conductively coupled to the PCM, wherein
thermal modulation of the PCM modulates a phase of the PCM which varies light transmission through the PCM.

Concept 33. A programmable infrared mirror comprising;
an array of light modulator cells mounted on a substrate, wherein
each of the light modulator cells comprises:
a layer of PCM having a first side and a second side;
a layer of optical reflector material configured to receive an optical beam from the second side of the PCM; and
a PCM heater thermally coupled conductively to the PCM, wherein
the optical beam incident on the first side of the PCM is optically modulated to change its intensity by varying the temperature of the PCM by the PCM heater.

What is claimed is:

1. A method of making a programmable infrared mirror comprising:
fabricating an array of separate unit cells on a substrate, wherein fabricating each of the separate unit cell comprises:
adding a layer of optical reflecting material on top of the substrate;
including a layer of phase change material (PCM) on top of the optical reflecting material that is configured to selectively absorb and transmit incident light; and
locating an absorber material at an interface between the separate unit cells;
thermally coupling a PCM heater with the PCM,
wherein an optical beam incident on the PCM is modulated to change its intensity by controlling the heating of the PCM by the PCM heater.

2. The method of making the programmable infrared mirror of claim 1, wherein the PCM is deposited by sputtering it on the substrate at room temperature.

3. The method of making the programmable infrared mirror of claim 1, further comprising depositing a layer of silicon dioxide on the substrate before the step of including the layer of optical reflecting material.

4. The method of making the programmable infrared mirror of claim 1, further comprising coating the PCM where the optical beam would be incident on the PCM with an anti-reflection coating.

5. The method of making the programmable infrared mirror of claim 1, wherein the PCM is made from a chalcogenide.

6. The method of making the programmable infrared mirror of claim 5, wherein the chalcogenide used is Germanium Tellurium (GeTe).

7. The method of making the programmable infrared mirror of claim 5, wherein the chalcogenide used is Bismuth doped GeTe.

8. An array of spatial light modulators comprising:
a first and a second spatial light modulator, wherein each of the first and second spatial light modulators comprising:
a layer of phase change material (PCM) having a first side and a second side, the layer of PCM configured to selectively absorb and transmit incident light;
an optical reflector configured to reflect an optical beam passing from the first side to the second side; and
a PCM heater disposed on the second side of the PCM, wherein thermal modulation of the PCM modulates a phase of the PCM; and
an absorber material located at an interface between the first and second spatial light modulators, and
wherein the first spatial light modulator is located adjacent to the second spatial light modulator.

9. The array of spatial light modulators of claim 8, wherein the PCM heater of the first spatial light modulator is controlled independently of the PCM heater of the second spatial light modulator.

10. The array of spatial light modulators of claim 8, wherein the PCM of the first spatial light modulator has a first composition and the PCM of the second spatial light modulator has a second composition, the first composition the same as the second composition.

11. The array of spatial light modulators of claim 8, wherein each spatial light modulator has a contrast ratio greater than or equal to 100.

12. The array of spatial light modulators of claim 8, wherein the array is a one-dimensional array.

13. The array of spatial light modulators of claim 8, wherein the array is a two-dimensional array.

14. The method of claim 1, wherein the absorber material is deposited separately from the PCM.

15. The method of claim 1, wherein the absorber material is present when the PCM conducts incident light.

16. The method of claim 1, wherein the absorber material bridges from within a first of the separate unit cells into a second of the separate unit cells.

17. The array of spatial light modulators of claim 8, wherein the absorber material is deposited separately from the PCM.

18. The array of spatial light modulators of claim 8, wherein the absorber material is present when the PCM conducts incident light.

19. The array of spatial light modulators of claim 8, wherein the absorber material bridges from within the first spatial light modulator into the second spatial light modulator.

* * * * *